US006721453B1

(12) United States Patent
Benson et al.

(10) Patent No.: US 6,721,453 B1
(45) Date of Patent: Apr. 13, 2004

(54) METHOD AND APPARATUS FOR PROCESSING AN IMAGE OF AN AGRICULTURAL FIELD

(75) Inventors: Eric R. Benson, Urbana, IL (US); Qin Zhang, Champaign, IL (US); John F. Reid, Champaign, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 0 days.

(21) Appl. No.: 09/612,688

(22) Filed: Jul. 10, 2000

(51) Int. Cl.[7] .......................... G06K 9/48; G05D 1/00; G06E 1/00; G06N 7/02
(52) U.S. Cl. ........................ 382/199; 701/23; 701/28; 701/40; 706/20; 706/52
(58) Field of Search ............................ 382/181, 103, 382/104, 106, 225, 165, 199; 701/23, 28, 40, 41, 50; 706/1–4, 8, 9, 20, 21, 52; 348/116, 201, 118, 119

(56) References Cited

U.S. PATENT DOCUMENTS

| | | | |
|---|---|---|---|
| 5,442,552 A | * | 8/1995 | Slaughter et al. ............. 701/50 |
| 5,704,200 A | * | 1/1998 | Chmielewski et al. ... 56/10.2 E |
| 5,828,971 A | | 10/1998 | Diekhans et al. |
| 5,857,539 A | | 1/1999 | Diekhans et al. |
| 5,911,669 A | * | 6/1999 | Stentz et al. ............. 56/10.2 F |
| 6,278,918 B1 | * | 8/2001 | Dickson et al. ............... 701/23 |
| 6,285,930 B1 | * | 9/2001 | Dickson et al. ............... 701/28 |
| 6,385,515 B1 | * | 5/2002 | Dickson et al. ............... 701/28 |
| 6,445,816 B1 | * | 9/2002 | Pettigrew .................... 382/162 |
| 6,546,117 B1 | * | 4/2003 | Sun et al. .................... 382/103 |

OTHER PUBLICATIONS

Reid, "The development of computer vision algorithms for agricultural vehicle guidance", Texas A & M University, 1987, Order No. 8802130.*

Reid, "Evaluation of colour representations for maize images", Journal of agricultural engineering research, 1996, 63 (3) pp. 185–195.*
Reid, "vision–based guidance of an agricultural tractor", IEEE Control Systems Magazine, 1987, V7, n2, p. 39(5).*
Reid, "Vision intelligence for an agricultural mobile robot using a neural network", 1998, 3rd IFAC/CIGR Workshop on Artificial Intelligence in Agriculture, pp. 139–144.*
*Vision–Based Perception for an Automated Harvester*, Mark Ollis & Anthony Stentz Robotics Institute, Carnegie Mellon University, Pittsburgh, Pennsylvania 15213 (7 pgs).
*First Results in Vision–Based Crop Line Tracking*, Mark Ollis & Anthony Stentz Robotics Institute, Carnegie Mellon University, Pittsburgh, Pennsylvania 15213 (6 pgs).
*An Adaptive Fuzzy Crop Edge Detection Method for Machine Version*, E.R. Benson; J.F. Reid; Q. Zhang; F.A.C. Pinto, Paper No. 00XXXX UILU–00–XXXX, An ASAE Meeting Presentation (12 pgs).
*Development of an Automated Combine Guidance System*, E.R. Benson; J.F. Reid; A. Zhang, Paper No. 00XXXX UILU 00–XXXX, An ASAE Meeting Presentation (6 pgs).

* cited by examiner

*Primary Examiner*—Samir Ahmed
*Assistant Examiner*—Brian Le
(74) *Attorney, Agent, or Firm*—John William Stader; Collin A. Webb (57) ABSTRACT

A method and apparatus for detecting an edge between a cut crop and an uncut crop in a field is disclosed. At least two scanlines of pixel data are processed based on an image of the field. A characteristic line corresponding to the cut/uncut edge is best fit between center location points of segments from each scanline using sequential regression analysis. A fuzzy logic algorithm is used to determine whether to continue processing each successive scanline of data based on the quality of the characteristic line. If certain fuzzy membership functions determine that the slope and intercept values have sufficiently converged, processing of the scanlines is completed and the agricultural vehicle is automatically guided along the cut/uncut edge corresponding to the characteristic line.

53 Claims, 5 Drawing Sheets

METHOD AND APPARATUS FOR PROCESSING AN IMAGE OF AN AGRICULTURAL FIELD

BACKGROUND OF THE INVENTION

1. Cross Reference to Related Applications

The present application is related to "A Method And Apparatus For Determining The Quality Of An Image Of An Agricultural Field Using A Plurality Of Fuzzy Logic Input Membership Functions", by Benson, et al., filed on an even date herewith.

2. Field of the Invention

This invention is in the field of automated agricultural guidance systems, specifically relating to processing an image of a field to determine a boundary between the cut crops and the uncut crops.

3. Description of the Related Art

Harvest is perhaps the most important stage of production agriculture. Within the United States, the corn and grain harvest is highly mechanized, with combines and forage harvesters performing the majority of the harvest. Tractors, trucks and wagons are used to transport the harvested crop from the field to the silos and market. Harvest brings both expectation and a tinge of nervousness. Harvest is a time when the farm and community come together, working long hours to bring in the crop.

Unfortunately, these characteristic long hours during harvest season lead to operator fatigue, thereby posing safety and quality control problems. Operators have to manipulate yield monitors, vehicle speed, header height, reel speeds and a host of other controls while they operate the combine. Vehicle automation has brought automatic header height control and improved ergonomics, but the task is both repetitive and complicated.

Automation is ideally suited to repetitive tasks. Agricultural machinery operation combines both repetitive operations (row following or surface coverage) and unique operations (road travel and a myriad of farm tasks). The open and changing environment combined with the safety and robustness requirements add to the difficulty for agricultural automation. Automation can mean simply assisting the driver or it can mean complete autonomous operation of the agricultural vehicle.

Researchers at several institutions have developed methodologies for autonomous agricultural vehicles (Reid and Searcy, 1991 O'Connor et al., 1995, Hoffman et al., 1996, Callaghan, et al., 1997). Different approaches have included mechanical guidance and sensor-based systems. Mechanical systems utilize feelers to detect furrows or rows of plants and the feeler position is converted to a guidance signal. Sensor-based systems rely on electronic sensors to determine the location of the vehicle either locally or with respect to an established coordinate frame.

Several manufacturers have developed and marketed mechanical systems. Sato et al. (1996) demonstrated a feeler based guidance system for Japanese style rice combines. Within the United States, factory and after-market row guidance systems are used in cotton harvesting.

Sensor-based technology has become attractive as sensor capacity has increased while prices have decreased. External sensors, including GPS and field based systems, and internal sensors, including machine vision and inertial systems, have been used for agricultural guidance. Researchers often combine the sensors to provide increased functionality.

For example, tractor guidance must take place regardless of the field conditions. During early season or preseason operations, the plants have not yet reached sufficient maturity to provide a visual reference for guidance. In this case, non-visual sensors such as GPS and inertial systems can provide the guidance signal. However, while many combines are fitted with GPS receivers for field monitors, the receivers do not have sufficient accuracy for guidance.

One of the primary keys to a successful automated agricultural guidance system is to extract certain features of interest from an image of the field. In particular, researchers have developed methodologies to extract the features of crop rows from an agricultural scene (Reid and Searcy, 1991). Generally, the algorithms previously developed assume that the camera is located above and roughly parallel to the camera orientation. For row crop guidance (for example, cultivation), the vehicle is aligned with the rows and the crop is shorter than tractor mounted camera.

Unfortunately, the situation dramatically changes when the camera is used to guide a combine. In particular, the feature of interest is no longer the parameterization of the crop rows, but rather the edge between the cut and uncut crop. In this situation, the harvester heads are up to 9 m wide, thereby necessitating the use of a wide-angle lens to see the entire head swath.

Hoffman, et al., (1996) developed an automated harvester (Demeter) for alfalfa and other field crops. In the Demeter project, cameras were installed on both sides of the cab. However, as the height of the camera is increased, perspective shift becomes a problem. The perspective shift for a given elevated camera location increases with the width of the head. The head width and the crop height make it difficult to accurately detect the cut/uncut boundary in the field using a single top mounted camera.

Due to the difficulties associated with a single top mounted camera, there is a need for an automated agricultural guidance system that determines the boundary between the cut/uncut crops. In particular, there is a need for a reliable method of processing an image of the field to determine the boundary between the cut/uncut crops. In multiple camera systems, the cameras are installed on each end of the head. These head-mounted cameras allow each of the cameras to directly see the cut/uncut boundary without the perspective shift issues of a cab-mounted camera. The head-mounted camera, however, sees a drastically different image than the cab-mounted cameras. Therefore, a new image processing method is needed to accommodate the change in the scene parameters.

SUMMARY OF THE INVENTION

Accordingly, one object of this invention is to provide a method of detecting an edge between a cut crop and an uncut crop in a field. The method includes processing at least two scanlines of pixel data based on an image of the field. A field boundary is generated and one or more characteristics of the image are calculated after each scanline is processed. Finally, the decision whether to continue processing is determined based on the first characteristic, the second characteristic and the vertical location of a particular scanline being processed in relation to the image.

Another object of this invention is to provide an agricultural vehicle configured to be guided through a field of crops by an automatic guidance system. The agricultural vehicle includes at least one camera mounted on the agricultural vehicle, an image processor and a central processing unit. The image processor is configured to process at least two scanlines of pixel data based on an image of the field. The central processing unit is configured to generate a field boundary, calculate a first characteristic of the image after processing each scanline of pixel data, calculate a second characteristic of the image after processing each scanline of pixel data, and determine whether to continue processing the pixel data based on the first characteristic, the second characteristic and the location of a particular scanline being processed in relation to the image.

Yet another object of this invention is to provide a method of detecting an edge between a cut crop and an uncut crop in a field by processing at least two scanlines of pixel data based on an image of the field. A field boundary is generated that divides the cut crop from the uncut crop. A first characteristic and a second characteristic of the image are calculated. The decision whether to continue processing the pixel data is based on a convergence of the first and second characteristics to a first value and a second value, respectively, wherein the first and second values are compared to a predetermined covariance threshold.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
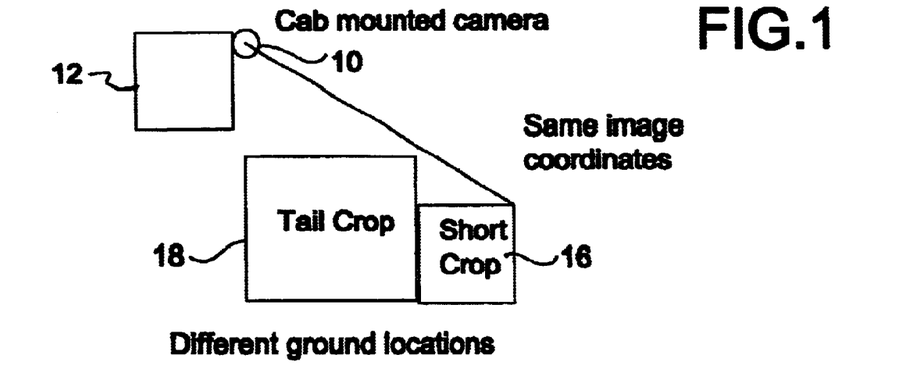
FIG. 1 is a diagram illustrating a cab-mounted camera.

A camera 10 mounted on a cab 12 takes images of a field to determine a boundary between the cut and uncut crop. Unfortunately, as the height of camera 10 is increased, perspective shift becomes a problem. In particular, there is a perspective shift for a given elevated camera location that increases with the width of a head 14 on a combine. The head width and the crop height (a short crop 16 versus a tall crop 18) make it difficult to accurately detect the cut/uncut boundary in the field using single cab-mounted camera 10.

Figure 2:
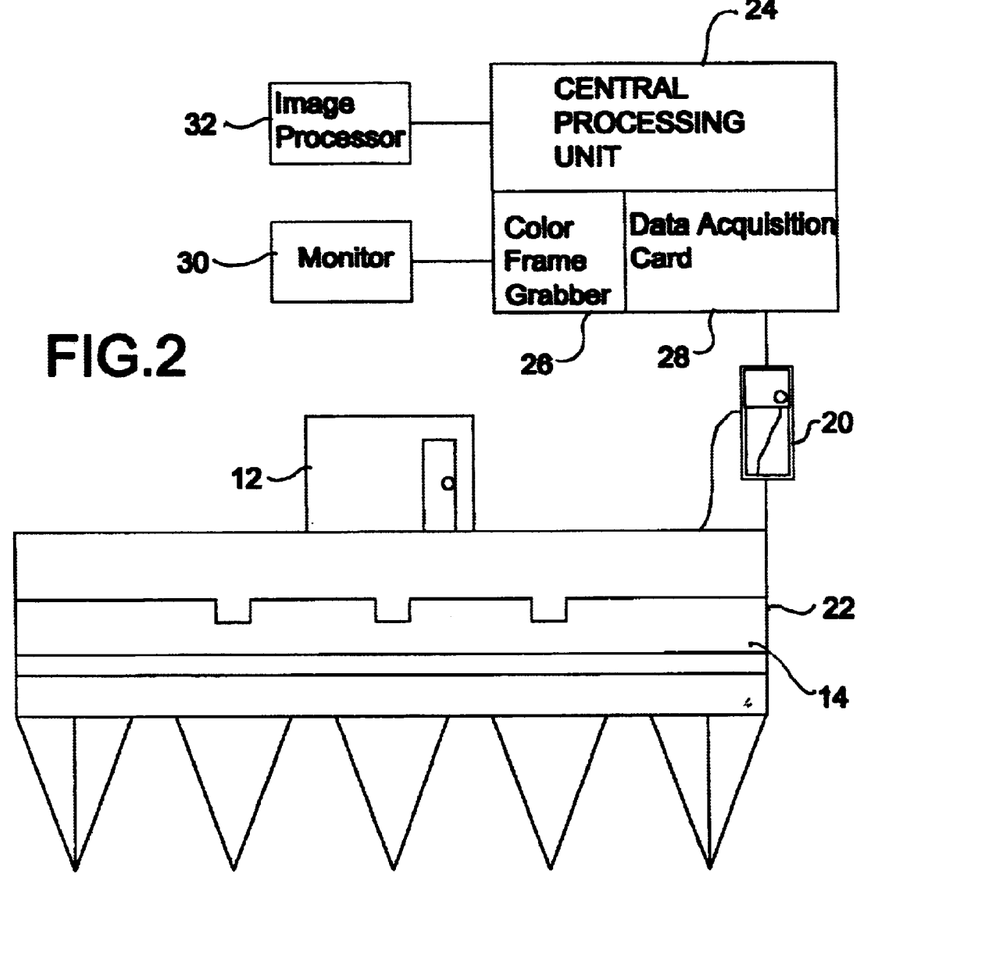
FIG. 2 is a diagram illustrating a header-mounted camera on a combine according to the present invention.

In order to accommodate for this perspective shift in the present invention, a camera 20 is mounted on an end 22 of head 14 on the combine. In this position, camera 20 is able to view straight down the lines separating the cut from the uncut field when the combine is perfectly lined up and in the proper position for harvesting. When the combine is in this position, the boundary defining the cut and uncut edge from the perspective of camera 20 is almost a vertical line, perhaps angling over about 20° towards the uncut side of the field, since camera 20 is offset slightly from the uncut row (e.g., 0–18" within the limits of head 14). Accordingly, a different image processing methodology is required to deal with the change in scene parameters that occurs when processing an image of the field taken with camera 10 versus camera 20. In the present invention, camera 20 has red, green and blue components, although a monochrome camera may alternatively be used. Camera 20 also includes a 800 nm narrow band NIR filter with a 6 mm lens.

Camera 20 is coupled to a central processing unit 24 that includes a color frame grabber 26 and a data acquisition card 28. CPU 24 is coupled to a monitor 30 and image processor 32. In the preferred embodiment of the present invention, CPU 24 is a 450 MHz AMD K6 processor, color frame grabber 26 is an ImageNation PXC-200 color frame grabber, and data acquisition card 28 is a National Instruments PCI-MIO-16E-1 data acquisition card. Finally, monitor 30 is a Computer Dynamics external flat screen monitor. Alternatively, other combinations of monitors, processors, frame grabbers and data acquisition cards may be used.

Figure 3:
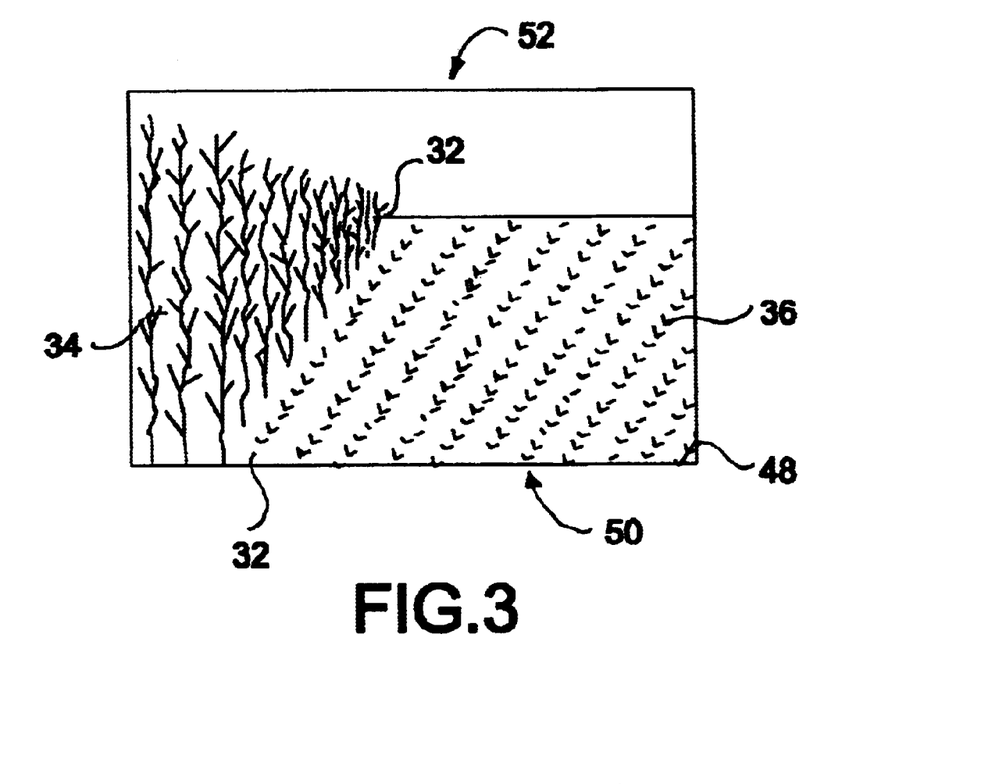
FIG. 3 is a diagram illustrating an image of a field having an edge formed between the cut crop and the uncut crop according to the present invention.
Figure 4:
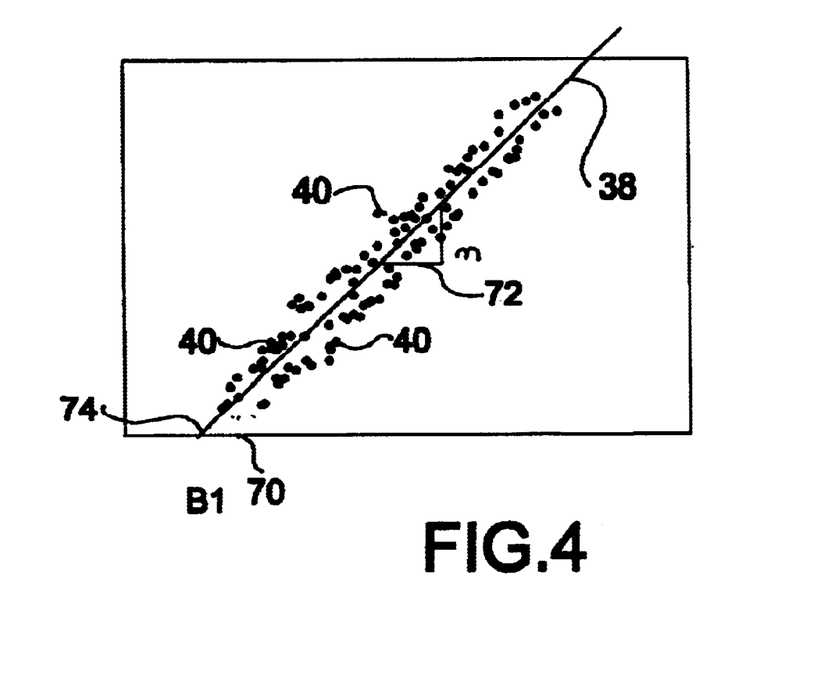
FIG. 4 is a diagram illustrating a characteristic line according to the present invention.
Figure 5:
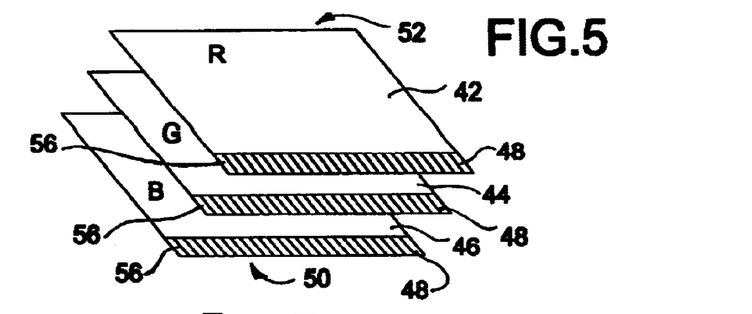
FIG. 5 is a diagram illustrating three image planes corresponding to a red channel, a green channel and a blue channel of the camera according to the present invention.
Figure 6:
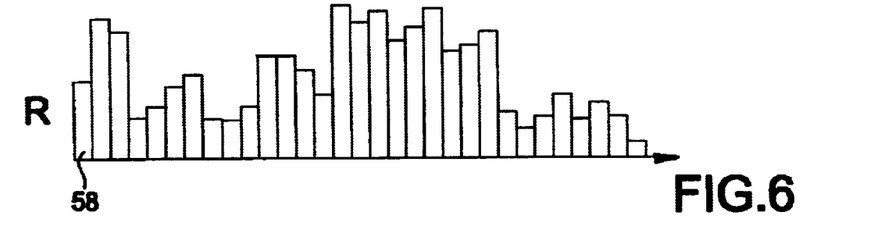
FIG. 6 is a graph of the magnitude of the red channel corresponding to each pixel in the first row of the red image plane of FIG. 5 according to the present invention.
Figure 7:
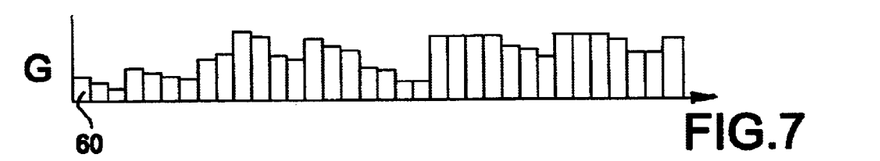
FIG. 7 is a graph of the magnitude of the green channel corresponding to each pixel in the first row of the green image plane of FIG. 5 according to the present invention.
Figure 8:
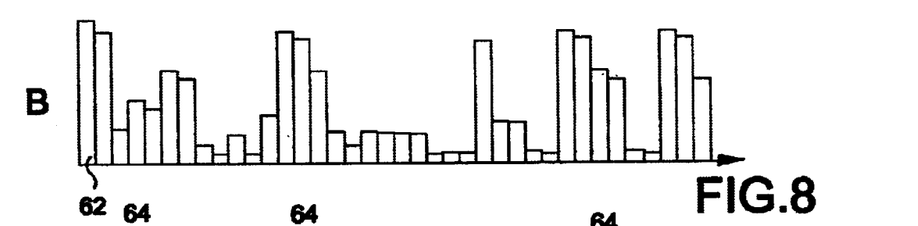
FIG. 8 is a graph of the magnitude of the blue channel corresponding to each pixel in the first row of the blue image plane of FIG. 5 according to the present invention.

As illustrated in FIG. 3, a field boundary 32 is formed between an uncut crop 34 and a cut crop 36 in the field. After field boundary 32 is determined, CPU 24 automatically steers the combine on course in relation to boundary 32. Field boundary 32 is based on a characteristic line 38 that is fit between a set of points 40 corresponding to a single datapoint for each scanline of the image (FIG. 4).

Referring to FIGS. 5–9, the image of the field taken by camera 20 includes a red image plane 42, a green image plane 44 and a blue image plane 46. Every pixel in the image is represented by three 8-bit values representative of the value of red, the value of green and the value of blue assigned to that particular pixel. CPU 24 processes the image beginning with a first scanline 48 located on a bottom end 50 opposite a top end 52 of the image. Top end 52 of the image generally contains sky and stalk, neither of which is important for determining the location of the field boundary between uncut crop 34 and cut crop 36. Therefore, processing each scanline from bottom end 50 towards top end 52 results in processing the more important information first and the image processing can be terminated when performance reaches a satisfactory level.

For example, a first pixel 56 includes a red component 58, a green component 60 and a blue component 62, wherein blue component 62 is larger than red component 58 that, in turn, is larger than green component 60. Red, green and blue components 58, 60, 62, respectively, are compared to an average RGB value for a first class and a second class. The first class corresponds to cut crop 36 and the second class corresponds to uncut crop 34. In the preferred embodiment of the present invention, this comparison is based on an adaptive clustering algorithm using a modified 2-class K-means adaptive classifier to classify each of the pixels in a scanline as belonging to the first class or to the second class. Alternate methods to classify the pixels and segment the scanlines may also be utilized. The K-means algorithm classifies the pixels using a minimum RGB distance calculation between a particular pixel and the first and second classes.

$$D_{ic}=\sqrt{(R_i-R_c)^2+(B_i-B_c)+(G_i \ldots}$$

where i is a pixel index, c is a class index, R is a red channel, B is a blue channel, G is a green channel and D is the RGB distance.

Thereafter, $D_{ic}$ for the first class is compared to the $D_{ic}$ for the second class. Depending on which $D_{ic}$ represents the minimal distance between the particular pixel and the class, the corresponding pixel is assigned a single bit value (0 for class 2 and 1 for class 1). The average RGB value assigned to each of the classes is recalculated on a scanline-by-scanline basis using the RGB pixel data obtained during the previous scanline processing.

Figure 9:
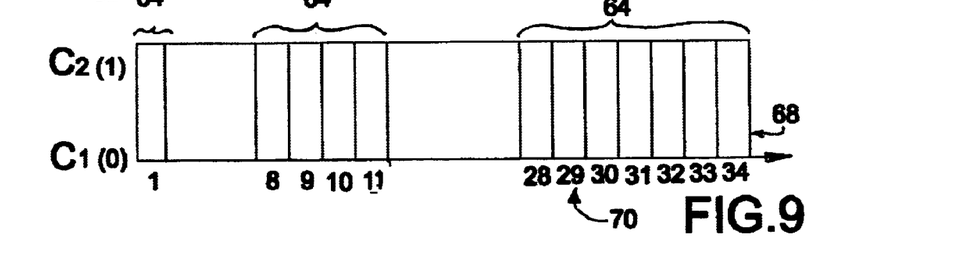
FIG. 9 is a diagram illustrating the classification of each pixel in the first row of FIG. 5 classified as a class 1 pixel or a class 2 pixel according to the present invention.

As illustrated in FIG. 9, for example, first pixel 56, pixels in positions 8–11, and pixels in positions 28–34 are assigned to class 2. Image processor 32 determines the locations of the transitions in first scanline 48 between classes. Image processor 32 further identifies a set of data segments 64 in scanline 48, calculates the length of each segment 64, and determines a longest segment 66 containing a center point 68 corresponding to pixel 31 in this particular example.

In particular, the length of segments 64 are calculated according to the following formula:

$$l=(X_{ij}-X_{(i-1)j})$$

where l is the distance between the transitions, x is the column location of the transition, j is the row index and i is an index of transitions within the row. Furthermore, the center location for each of segments 64 is calculated according to the following formula:

$$x_j = \left(\frac{x_{ij} + x_{(i-1)j}}{2}\right)$$

where x is the column location of the transition, j is the row index and i is an index of transitions within the scanline. Center location 70 of longest segment 68 in first scanline 48 is the first datapoint used to generate characteristic line 38. Subsequent center location points corresponding to the center location of the longest segment in subsequent scanlines are used to iteratively generate characteristic line 38.

In the preferred embodiment of the present invention, characteristic line 38 is fit to set of points 40 representing the center location of the longest segment in each scanline using sequential linear regression. In a "normal" linear regression, the regression is a post-image processing calculation. In other words, the processing has already been completed when the regression is performed. In the sequential linear regression in the present invention, the regression parameters are updated during processing. Therefore, the regression converges to a value and, thereafter, additional points have little effect on the regression. The regression analysis can be stopped at any point after convergence with no effect on accuracy.

In the preferred embodiment of the present invention, the sequential linear regression includes a weighting factor. The weighting factor can be set to unity so that all values are weighted equally. For combine guidance, however, information at top 52 of the image is further away and has less importance for the immediate guidance correction. In particular, the following weighting formula reduces the weight as the distance from the previous regression line is increased, thereby decreasing the weight of the outlier data points and significantly improving the performance:

$$w = 2 \exp\left(-\frac{d}{\frac{(ImageWidth)}{10}}\right)$$

$$d=|X_j-\bar{X}_j|$$

$$\bar{X}_j=j^*m_{i-1}+b_{i-1}$$

where w is the weight in the regression for a given transition, ImageWidth is the maximum width of the image in pixels, $X_j$ is the previously calculated center point, d is the distance in pixels between the expected and actual transition, j is the row index, m is the linear regression slope from the previous scanline(s) and b is the linear regression intercept from the previous scanline(s).

Operators rely on intuition to determine if something is correct. We instinctively and unconsciously evaluate the world around us. As we increasingly turn to automation, it is important to evaluate the sensor data and the system decisions. Fuzzy logic allows an operator to take advantage of system knowledge and to define the system linguistically. In a fuzzy logic system, the quality of the output is categorized as acceptable or unacceptable.

Fuzzy logic has been applied to many different types of problems since Zadeh introduced it in 1965. Unlike traditional logic, fuzzy logic is suited to evaluating subjective situations. For agriculture, the subjectivity of fuzzy logic is particularly appealing (Zhang and Litchfield, 1990, 1991, 1993, 1994). Field conditions such as the weather, the position and intensity of the sun and dust, and crop conditions such as size, shape, weed and pest pressure, combine to create a difficult situation for conventional logic.

For example, given a pile of fruit, we can separate apples and oranges. If we are looking at a Jonamac apple, our description might include red, a hint of green and a mostly round shape. If we look at a Granny Smith apple, the description might include green, smooth and oblong. An orange would have an orange color, a rough texture and a round as descriptors. While we can verbally describe apples and oranges, it's considerably more difficult to create a mathematical description of an apple or orange that will apply for all situations. Similarly, evaluating the wide range of variations in the agriculture field using fuzzy logic simplifies the process.

Fuzzy logic is based on set theory. In conventional set theory, a value either is or is not a member of a set. In fuzzy logic, the member can be partially a member of a set. For example, a Granny Smith apple is partially round. The apple might have a value of $\mu_{GS}(x)$ round and $(1-\mu_{GS}(x))$ not round.

Each element of the set is evaluated independently based on a set of membership functions. The membership functions used to describe the classes in question. The membership functions are based on the linguistic classes used to describe the items. The number of membership classes and the membership functions within the class will vary with the situation. In the fruit example, membership classes might include roundness, a color index and surface texture. Within the roundness class, there may be two functions (round/not round) while other classes (color index) may require more functions to adequately describe the situation.

With a single class, an element is either a member of the class (1) or it is not (0). With fuzzy logic, an element can be a member of multiple classes. For any two fuzzy sets (S1 and S2), three basic operations can be defined:

Intersection: $\mu_{s1 \cap s2} = \min\{\mu_{s1}(u), \mu_{s2}(u)\}$

Union: $\mu_{s1 \cap s2} = \max\{\mu_{s1}(u), \mu_{s2}(u)\}$

Complement: $\mu_{s1} = 1 - \mu_{s1}$

Fuzzy logic systems can be single input-single output, multiple input-single output or multiple input-multiple output.

In the preferred embodiment of the present invention, a fuzzy logic analysis determines when the regression had reached satisfactory convergence. As described above, this analysis is based on a system of rules (rules base) that defines a mapping from the input to fuzzy classification and back again. For example, consider the following fuzzy rule:

If (Scanline Location<TransitionEnd) then the fuzzy classification is "Acceptable"

The input is mapped into a single membership function but, in actual use, the membership function is typically mapped into portions of two different functions. A similar procedure is used during defuzzification to map from the fuzzy membership functions to a crisp value.

As illustrated in FIGS. 10–13, the decision whether to continue each successive scanline of pixel data is based on a first characteristic of the image, a second characteristic of the image and the location of a particular scanline being processed in relation to the image. The first characteristic of the image is a slope covariance 72 (FIG. 4) of the image based on characteristic line 38. The second characteristic of the image is an intercept covariance 74 of the image based on the characteristic line. Intercept 74 can be calculated in relation to the intercept with bottom 50 of the image, top 52 of the image, or some intermediate point. The location of intercept 74, however, must remain consistent throughout the regression analysis.

Figure 10:
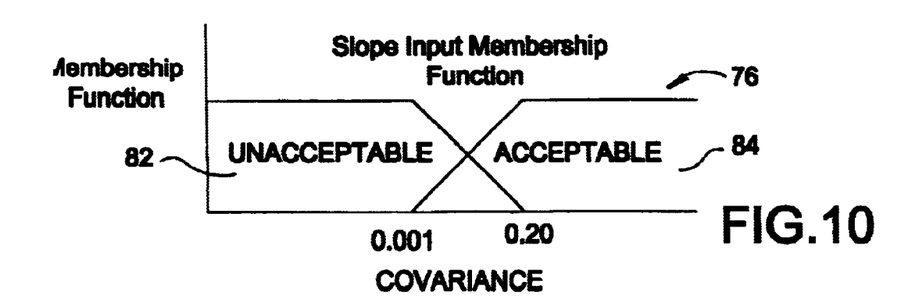
FIG. 10 is a diagram illustrating a slope input membership function according to the present invention.
Figure 11:
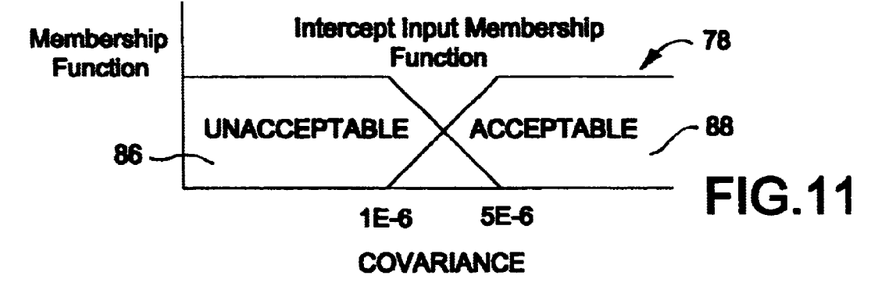
FIG. 11 is a diagram illustrating an intercept input membership function according to the present invention.
Figure 12:
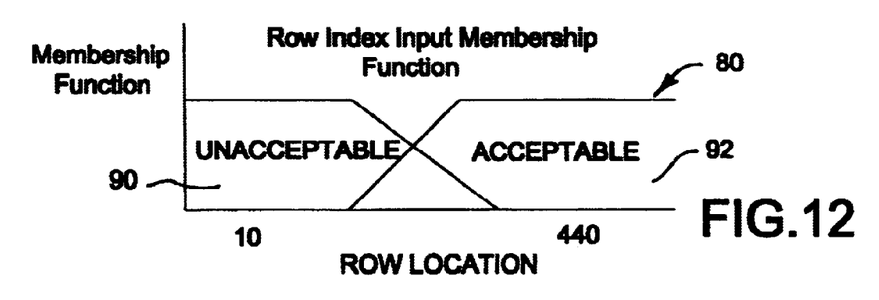
FIG. 12 is a diagram illustrating a row index input membership function according to the present invention.

A first membership function 76 is assigned to first characteristic 72, a second membership function 78 is assigned to second characteristic 74, and a third membership function 80 is assigned to the location of the particular scanline being processed. Within first membership function 76, a region of unacceptable values 82 and a region of acceptable values 84 are defined. Similarly, within the second membership function 78, a region of unacceptable values 86 and a region of acceptable values 88 are defined. Finally, within third membership function 80, a region of unacceptable values 90 and a region of acceptable values 92 are defined. First characteristic 72, second characteristic 74 and the location of the particular scanline being processed provide a measure of the convergence of the regression of characteristic line 38.

In the preferred embodiment of the present invention, a first acceptability value corresponding to slope covariance 72, a second acceptability value corresponding to intercept covariance 74 and a third acceptability value corresponding to the location of the particular scanline being processed range from a scale of 0 to 1. Depending on the units used by CPU 24 and image processor 32 and the type of system sensors, one or more of the membership functions can be scaled or weighted more than the other membership functions.

Figure 13:
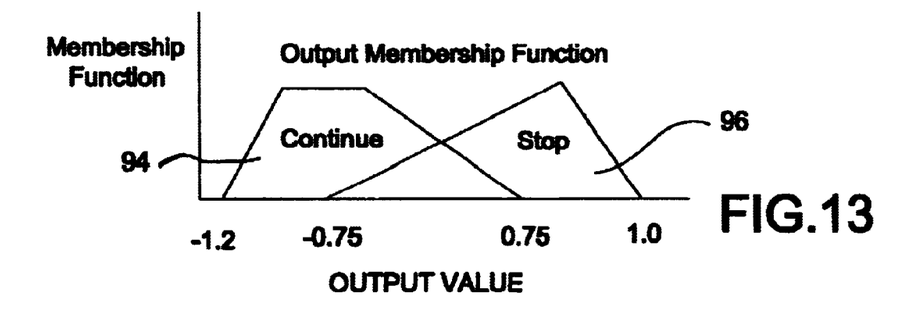
FIG. 13 is a diagram illustrating an output membership function according to the present invention.

The first, second and third acceptability values are combined and input into an output membership function 92 that includes a "continue" region 94 and a "stop" region 96. A center of gravity defuzzification method calculates an output value from the result of output membership function 92. The defuzzified output is an acceptable/unacceptable output indicating that processing of the image is sufficiently completed insofar that any subsequent data obtained from an additional scanline in the image will not significantly change the current slope and intercept of characteristic line 38.

Figure 14:
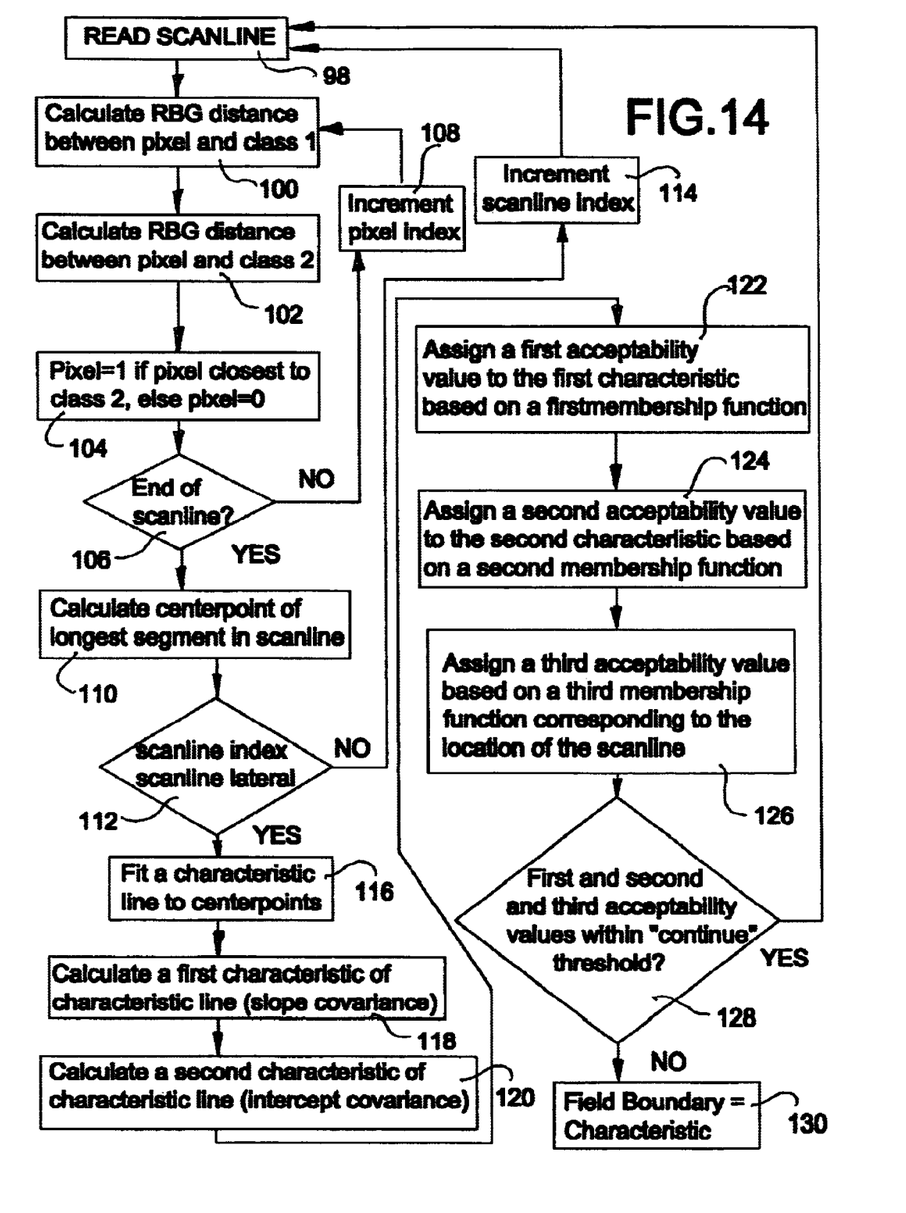
FIG. 14 is a flow chart illustrating the process for defining a field boundary based on the image of the field according to the present invention.

Referring to FIG. 14, in operation, first scanline 48 of the image is obtained by color frame grabber 26 in a step 98. In a step 100, the minimum RGB distance is calculated for the first pixel of scanline 48 between the first pixel and the first class corresponding to cut crop 36. Similarly, in a step 102, the minimum RGB distance is calculated for the first pixel of scanline 48 between the first pixel and the second class corresponding to uncut crop 34.

$D_{ic} = \sqrt{(R_i - R_c)^2 + (B_i - B_c)^2 + (G_i - G_c)^2}$ where i is a pixel index, c is a class index, R is a red channel, B is a blue channel, G is a green channel and D is the RGB distance.

In a step 104, the pixel is assigned a value of 1 if the pixel is closest to the second class based on the RGB distance calculation, otherwise the pixel is assigned a value of 0. If the pixel being processed is not the last pixel in the particular scanline being processed in a stop 106, a pixel index is incremented in a step 108 and processing continues with each successive pixel in the scanline at step 100.

After all of the pixels in the particular scanline have been processed, the scanline is now represented by a series of 1's and 0's. In a step 110, transition points between pixels in the scanline are identified to define segments 64. The lengths of segments 64 are calculated based on:

$l = (X_{ij} - X_{(i-1)j})$ where I is the distance between the transitions, x is the column location of the transition, j is the row index and i is an index of transitions within the row. Furthermore, the center location for each of segments 64 is calculated according to the following formula:

$$x_j = \left( \frac{x_{ij} + x_{(i-1)j}}{2} \right)$$

where x is the column location of the transition, j is the row index and i is an index of transitions within the scanline. Center location 70 of longest segment 68 in first scanline 48 is the first datapoint used to generate characteristic line 38. Subsequent center location points corresponding to the center location of the longest segments in subsequent scanlines are used to iteratively generate characteristic line 38.

Prior to fitting characteristic line 38 to the center location points corresponding to the center location of the longest segments in the scanlines, the center location points are collected for a predetermined number of scanlines in order to yield an initial data set. In step 112, if not enough scanlines have been processed yet to complete the initial data set, the scanline index is incremented in a step 114 and processing returns to step 98 to process the next scanline.

After enough center location points have been calculated, characteristic line 38 is generated in a step 116 by CPU 24. CPU 24 calculates the first characteristic (slope) of characteristic line 38 in a step 118 and the second characteristic (intercept) of characteristic line 38 in a step 120. CPU 24 then performs sequential regression analysis to determine the slope and the intercept that best fits the center location points. The regression analysis is sequential insofar that the slope and the intercept of characteristic line 38 are recalculated using each new center point from each successive scanline being processed.

In a step 122, the first acceptability value is assigned to the first characteristic based on first membership function 76. In a step 124, the second acceptability value is assigned to the second characteristic based on second membership function 78. Finally, in a step 126, a third acceptability value is assigned corresponding to the location of the scanline based on third membership function 80.

These three characteristics of the image (slope covariance, intercept covariance and the particular row location in the image) are then combined and applied to output membership function 92 in a step 128. The results defuzzified to determine whether sufficient rows have been processed to provide an acceptable representation of the field boundary between the cut and the uncut portions of the field. If the successive calculations of characteristic line 38 based upon the new center location points results in characteristic line 38 being of sufficiently high quality (e.g., if the output value is outside of a "continue" threshold), then all further image processing is stopped and the field boundary is represented by the current characteristic line 38 in a step 130. If, however, the output value is within a "continue" threshold, processing returns to step 98 and the next scanline is processed.

While the detailed drawings, specific examples, and particular formulations given describe exemplary embodiments, they serve the purpose of illustration only. For example, the number of cameras and the camera locations may differ depending on a variety of factors including the particular crop being harvested and the layout of the field. Multiple cameras may be mounted on the cab and on each end of the head of the combine. Therefore, the configurations shown and described are not limited to the precise details and conditions disclosed. Furthermore, other substitutions, modifications, changes and omissions may be made in the design, operating conditions and arrangement of exemplary embodiments without departing from the spirit of the invention as expressed in the appended claims.

What is claimed is:

1. A method of detecting an edge between a cut crop and an uncut crop in a field, the method comprising:
    processing at least two scanlines of pixel data based on an image of the field;
    generating a field boundary approximating the edge between a cut crop and an uncut crop in a field;
    calculating a first characteristic of the image after processing each scanline of pixel data;
    calculating a second characteristic of the image after processing each scanline of pixel data; and
    determining whether to continue processing the pixel data based on the first characteristic, the second characteristic and the location of a particular scanline being processed in relation to the image.

2. The method according to claim 1, wherein the scanline of pixel data that is processed first is obtained from a bottom of the image.

3. The method according to claim 1, wherein the processing step further includes classifying the pixel data into a first class of data and a second class of data.

4. The method according to claim 3, wherein the first class of data represents the cut crop and the second class of data represents the uncut crop.

5. The method according to claim 4, wherein the pixel data is processed based on an adaptive clustering algorithm.

6. The method according to claim 5, wherein the pixel data includes a plurality of pixels and each of the pixels include a red component, a green component and a blue component.

7. The method according to claim 6, wherein each of the pixels are assigned to the first class or the second class based on whether the red, green and blue components of each of the pixels are closest to the first class or the second class.

8. The method according to claim 7, wherein each of the pixels are determined to be closest to the first class or the second class by calculating a first minimum RGB distance between each of the pixels and the first class, calculating a second minimum RGB distance between each of the pixels and the second class, and assigning each of the pixels to the first class if the first minimum RGB distance is smaller than the second minimum RGB distance.

9. The method according to claim 8, wherein the first and second minimum RGB distances are calculated based on $$D_{ic} = \sqrt{(R_i - R_c)^2 + (B_i - B_c)^2 + (G_i - G_c)^2}$$

wherein i is a pixel index, c is a class index, R is a red channel, B is a blue channel, G is a green channel and D is the RGB distance.

10. The method according to claim 9, wherein each of pixels are assigned a single bit value.

11. The method according to claim 10, wherein each of the pixels in the first class are assigned a value of 1 and each of the pixels in the second class are assigned a value of 0.

12. The method according to claim 11, wherein the generating step includes dividing the scanline into a plurality of segments based on calculating a plurality of transition points between the first class and the second class, calculating a length for each of the segments, and calculating a center location for each of the plurality of segments.

13. The method according to claim 12, wherein the length of the plurality of segments is calculated based on $$I = (X_{ij} - X_{(i-1)j})$$

wherein I is the distance between transitions, x is the column location of the transition, j is the row index and i is an index of transitions within the row.

14. The method according to claim 12, wherein the center location for each of the plurality of segments is calculated based on $$x_j = \left( \frac{x_{ij} + x_{(i-1)j}}{2} \right)$$

wherein I is the distance between transitions, x is the column location of the transition, j is the row index and i is an index of transitions within the row.

15. The method according to claim 12, wherein a characteristic line representing the field boundary is fit to a set of points comprising the center location of the longest segment in each scanline.

16. The method of claim 15, wherein the characteristic line is calculated for a first time after a predetermined number of the scanlines is processed.

17. The method of claim 16, wherein subsequent to the characteristic line being calculated for the first time, the characteristic line is recalculated after each successive scanline is processed.

18. The method according to claim 17, wherein the step of calculating the first characteristic of the image includes determining a slope covariance of the image based on the characteristic line.

19. The method according to claim 18, wherein the step of calculating the second characteristic of the image includes determining an intercept covariance of the image based on the characteristic line.

20. The method according to claim 19, wherein the slope covariance and the intercept covariance are recalculated after each successive scanline is processed.

21. The method according to claim 20, wherein the slope covariance and the intercept covariance are calculated using sequential linear regression analysis.

22. The method according to claim 21, wherein the pixel data of a particular scanline is weighted proportional to the location of the particular scanline in relation to the bottom of the image.

23. A method of detecting an edge between a cut crop and an uncut crop in a field, the method comprising:

processing at least two scanlines of pixel data based on an image of the field;
   generating a field boundary;
   calculating a first characteristic of the image after processing each scanline of pixel data;
   calculating a second characteristic of the image after processing each scanline of pixel data; and
   determining whether to continue processing the pixel data based on the first characteristic, the second characteristic and the location of a particular scanline being processed in relation to the image, wherein the scanline of pixel data that is processed first is obtained from a bottom of the image, wherein the processing step further includes classifying the pixel data into a first class of data and a second class of data, wherein the first class of data represents the cut crop and the second class of data represents the uncut crop, wherein the pixel data is processed based on an adaptive clustering algorithm, wherein the pixel data includes a plurality of pixels and each of the pixels include a red component, a green component and a blue component, wherein each of the pixels are assigned to the first class or the second class based on whether the red, green and blue components of each of the pixels are closest to the first class or the second class, wherein each of the pixels are determined to be closest to the first class or the second class by calculating a first minimum RGB distance between each of the pixels and the first class, calculating a second minimum RGB distance between each of the pixels and the second class, and assigning each of the pixels to the first class if the first minimum RGB distance is smaller than the second minimum RGB distance, wherein the first and second minimum RGB distances are calculated based on $$D_{ic} = \sqrt{(R_{i-R_c})^2 + (B_{i-B_c}) + (G_{i\ldots}}$$

wherein i is a pixel index, c is a class index, R is a red channel, B is a blue channel, G is a green channel and D is the RGB distance, wherein each of pixels are assigned a single bit value, wherein each of the pixels in the first class are assigned a value of 1 and each of the pixels in the second class are assigned a value of 0, wherein the generating step includes dividing the scanline into a plurality of segments based on calculating a plurality of transition points between the first class and the second class, calculating a length for each of the segments, and calculating a center location for each of the plurality of segments, wherein a characteristic line representing the field boundary is fit to a set of points comprising the center location of the longest segment in each scanline, wherein the characteristic line is calculated for a first time after a predetermined number of the scanlines is processed, wherein subsequent to the characteristic line being calculated for the first time, the characteristic line is recalculated after each successive scanline is processed, wherein the step of calculating the first characteristic of the image includes determining a slope covariance of the image based on the characteristic line, wherein the step of calculating the second characteristic of the image includes determining an intercept covariance of the image based on the characteristic line, wherein the slope covariance and the intercept covariance are recalculated after each successive scanline is processed, wherein the slope covariance and the intercept covariance are calculated using sequential linear regression analysis, wherein the pixel data of a particular scanline is weighted proportional to the location of the particular scanline in relation to the bottom of the image, and wherein the pixel data is weighted based on $$w = 2e\left(-\frac{d}{\frac{(ImageWidth)}{10}}\right)$$

$$d = |X_j - \bar{X}_j|$$

$$\bar{X}_j = j^* m_{i-1} + b_{i-1}$$

wherein w is the weight in the regression for a given transition, ImageWidth is the maximum width of the image in pixels, $X_j$ is the characteristic point from above, d is the distance in pixels between the expected and actual transition, j is the row index, m is the linear regression slope from a previous image and b is the linear regression intercept from the previous image.

24. The method according to claim 1, wherein the determining step includes assigning a first membership function to the first characteristic, a second membership function to the second characteristic and a third membership function to the location of the particular scanline.

25. The method according to claim 24, wherein the first membership function assigns a first acceptability value to the first characteristic, the second membership function assigns a second acceptability value to the second characteristic, and the third membership function assigns a third acceptability value to the location of the particular scanline.

26. The method according to claim 25, wherein the first, second and third acceptability values are combined and compared to a threshold value to determine whether to continue processing the scanlines of the pixel data.

27. An agricultural vehicle configured to be guided through a field of crops by an automatic guidance system, the agricultural vehicle comprising:

at least one camera mounted on the agricultural vehicle;
   an image processor configured to process at least two scanlines of pixel data based on an image of the field; and
   a central processing unit configured to generate a field boundary approximating an edge between a cut crop and an uncut crop in a field, calculate a first characteristic of the image, calculate a second characteristic of the image, and determine whether to continue processing the pixel data based on the first characteristic, the second characteristic and the location of a particular scanline being processed in relation to the image.

28. The agricultural vehicle according to claim 27, wherein the agricultural vehicle is a harvester having a plurality of heads.

29. The agricultural vehicle according to claim 28, wherein the at least one camera is mounted on at least one of the plurality of heads.

30. The agricultural vehicle according to claim 29, wherein the pixel data is divided into a first class of data and a second class of data.

31. The agricultural vehicle according to claim 30, wherein the first class of data represents the cut crop and the second class of data represents the uncut crop.

32. The agricultural vehicle according to claim 31, wherein the pixel data includes a plurality of pixels and each of the pixels include a red component, a green component and a blue component.

33. The agricultural vehicle according to claim 32, wherein each of the pixels are assigned to the first class or the second class based on whether the red, green and blue components of each of the pixels are closest to the first class or the second class.

34. The agricultural vehicle according to claim 33, wherein each of the pixels are determined to be closest to the first class or the second class by calculating a first minimum RGB distance between each of the pixels and the first class, calculating a second minimum RGB distance between each of the pixels and the second class, and assigning each of the pixels to the first class if the first minimum RGB distance is smaller than the second minimum RGB distance.

35. The agricultural vehicle according to claim 34, wherein the first and second minimum RGB distances are calculated based on $$D_{ic} = \sqrt{(R_i - R_c)^2 + (B_i - B_c) + (G_{i.})}$$

wherein i is the pixel index, c is the class index, R is the red channel, B is the blue channel, G is the green channel and D is the RGB distance.

36. The agricultural vehicle according to claim 35, wherein each of pixels are assigned a single bit value.

37. The agricultural vehicle according to claim 36, wherein each of the pixels in the first class are assigned a value of 1 and each of the pixels in the second class are assigned a value of 0.

38. The agricultural vehicle according to claim 37, wherein a particular scanline being processed is divided into a plurality of segments by calculating a plurality of transition points between the first class and the second class, calculating a length for each of the segments, and calculating a center location for each of the plurality of segments.

39. The agricultural vehicle according to claim 38, wherein the length of the plurality of segments is calculated based on $$I = (X_{ij} - X_{(i-1)j})$$

wherein I is the distance between transitions, x is the column location of the transition, j is the row index and i is an index of transitions within the row.

40. The agricultural vehicle according to claim 39, wherein the center location for each of the plurality of segments is calculated based on $$x_j = \left(\frac{x_{ij} + x_{(i-1)j}}{2}\right)$$

wherein i is the distance between transitions, x is the column location of the transition, j is a row index and I is an index of transitions within the row.

41. The agricultural vehicle according to claim 40, wherein a characteristic line representing the field boundary is fit to a set of points comprising the center location of the longest segment in each scanline.

42. The agricultural vehicle according to claim 41, wherein the characteristic line is calculated for a first time after a predetermined number of the scanlines is processed.

43. The agricultural vehicle according to claim 42, wherein subsequent to the characteristic line being calculated for the first time, the characteristic line is recalculated after each successive scanline is processed.

44. The agricultural vehicle according to claim 43, wherein the first characteristic of the image is calculated by determining a slope covariance of the image based on the characteristic line.

45. The agricultural vehicle according to claim 44, wherein the second characteristic of the image is calculated by determining an intercept covariance of the image based on the characteristic line.

46. The agricultural vehicle according to claim 45, wherein the slope covariance and the intercept covariance are recalculated after each successive scanline is processed.

47. The agricultural vehicle according to claim 46, wherein the slope covariance and the intercept covariance are calculated using sequential linear regression analysis.

48. A method of detecting an edge between a cut crop and an uncut crop in a field, the method comprising:

processing at least two scanlines of pixel data based on an image of the field;

generating a field boundary approximating the edge between the cut crop and the uncut crop in a field and dividing the cut crop from the uncut crop;

calculating a first characteristic of the image;

calculating a second characteristic of the image; and determining whether to continue processing the pixel data based on a convergence of the first and second characteristics to a first value and a second value, respectively, wherein the first and second values are compared to a predetermined covariance threshold.

49. The method according to claim 48, wherein the step of determining whether to continue processing the pixel data is further based on the location of a particular scanline being processed in relation to the image.

50. The method according to claim 49, wherein the location of a particular scanline being processed is assigned a third value.

51. The method according to claim 50, wherein the step of determining whether to continue processing the pixel data is based on calculating an output value by combining the first, second and third values and comparing the output value to the threshold.

52. The method according to claim 51, wherein the processing step further includes classifying the pixel data into a first class of data and a second class of data.

53. The method according to claim 52, wherein the first class of data represents the cut crop and the second class of data represents the uncut crop.

* * * * *